United States Patent [19]

Lirones

[11] Patent Number: 4,790,874

[45] Date of Patent: Dec. 13, 1988

[54] METHOD FOR FORMING METALS WITH REDUCED IMPURITY CONCENTRATIONS

[75] Inventor: Nick G. Lirones, Muskegon, Mich.

[73] Assignee: Howmet Turbine Components Corporation, Greenwich, Conn.

[21] Appl. No.: 3,749

[22] Filed: Jan. 16, 1987

[51] Int. Cl.$^4$ ............................................. C22B 9/00
[52] U.S. Cl. ...................................... 75/93 R; 75/63; 75/65 R
[58] Field of Search ...................... 75/63, 65 R, 93 R

[56] References Cited

U.S. PATENT DOCUMENTS

| | | | |
|---|---|---|---|
| 975,955 | 11/1910 | Hughes | 75/77 |
| 1,037,538 | 9/1912 | Rockey et al. | 75/72 |
| 3,955,970 | 5/1976 | Claxton et al. | 75/68 R |
| 4,221,590 | 9/1980 | Dawless | 75/63 |

Primary Examiner—Peter D. Rosenberg
Attorney, Agent, or Firm—Finnegan, Henderson, Farabow, Garrett & Dunner

[57] ABSTRACT

A method of purifying molten metal that reduces the amount of contaminants therein by maintaining the molten metal in a quiescent state allowing buoyant impurities in the metal to float to the top. The top of the molten metal is cooled solidifying the top portion and entrapping the impurities in the solid layer. The molten metal is then cast from beneath the solid portion.

5 Claims, 1 Drawing Sheet

METHOD FOR FORMING METALS WITH REDUCED IMPURITY CONCENTRATIONS

FIELD OF THE INVENTION

The present invention relates to a method of forming molten metal in a manner that minimizes the introduction of undesirable impurities into the cast material.

BACKGROUND OF THE INVENTION

In an effort to improve the mechanical properties of existing materials used in applications where the performance of the material is critical, there is an on-going effort to form articles used in such critical applications from the cleanest possible materials. It has been determined that the presence of contaminants in metals used in critical applications is the source of scatter in mechanical properties, especially with respect to low-cycle fatigue properties. Therefore, the manner in which such materials are formed into the articles being used in such critical applications has been under scrutiny to eliminate, exclude, or minimize the detrimental effect of contaminants within the final article.

Where such articles are formed by powder metallurgy techniques, the powder production methods and materials handling practice is carefully controlled in order to prevent the introduction of undesirable contaminants. Where the article is formed by casting techniques, the handling of the molten material and the formation of that material into the desired end product must be carefully controlled in order to prevent the introduction of undesirable contaminants that will affect the properties of the final product. In some instances, it may also be possible to use thermomechanical processing to eliminate the detrimental effects of such contaminants when they are present.

The means by which these improvements are accomplished adds significantly to the cost of the article being produced and precludes their use in a number of applications. In addition, while some of the proposed methods of producing contaminant free metals are feasible on a laboratory scale, such processes are difficult to implement on an industrial scale.

Therefore, it is the principal object of the present invention to provide a method of casting metal which does not introduce contaminants into the casting and simultaneously removes from the material being cast the contaminants therein. It is a further object of the invention to provide a method for casting contaminant-free metal that can be readily adapted to industrial processes. It is a further object of the invention to provide a method for casting contaminant-free metal that can be utilized in a controlled atmosphere where access to the liquid metal dispensing container is restricted.

SUMMARY OF THE INVENTION

To achieve these and other objects of the invention, there is provided a method for purifying molten metal. The method includes melting the molten metal in a container that is surrounded by an inert atmosphere and maintaining the molten metal in a quiescent state to allow buoyant impurities therein to float to the top of the molten metal. The top of the molten metal is then cooled to solidify the top portion of the molten metal within the container to form a solid layer for entrapping impurities within the solid layer. The outer periphery of the solid portion adajcent the container is melted. The molten metal is then poured from beneath the solid portion. Preferably, the top of the molten metal is solidified by removing an insulated cover from the container, thereby reducing the temperature at the top portion of the molten metal.

DESCRIPTION OF THE PREFERRED EMBODIMENT

Figure 1:
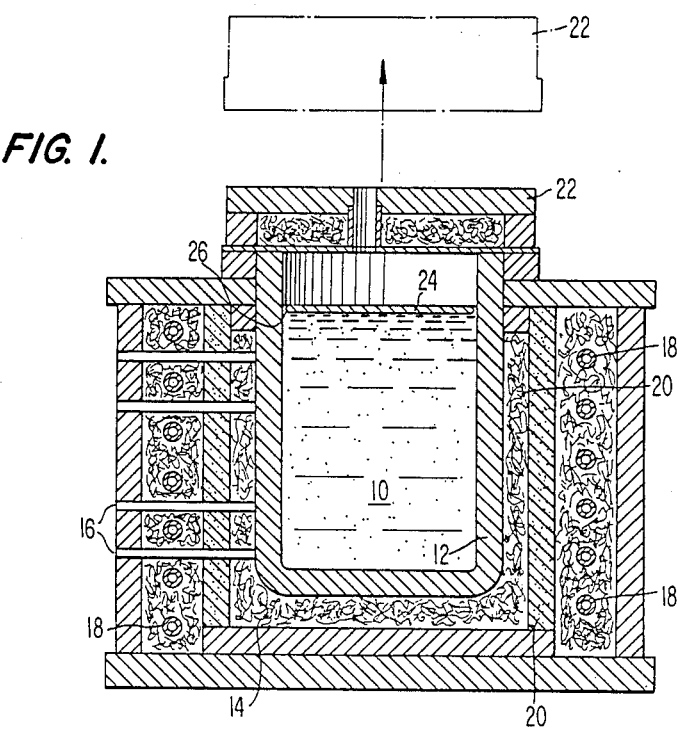
FIG. 1 is a schematic cross section of a melting and casting crucible used in connection with the practice of the present invention.

The present invention is a method of purifying molten metal and is especially adapted for the casting of molten metals used in applications where the mechanical properties of the article being cast are critical. Turbine components such as disks, seals, blade retainers and shafts for high performance gas turbine engines are examples of such articles.

The operating environment of such articles and the criticality of their performance under severe operating conditions makes it important that contaminants that could affect mechanical properties be eliminated to the furthest extent possible. It is not believed that the present invention is limited to any particular metal or metal system and as used herein, the molten metal refers to any metal or metal alloy that can be formed from the molten state. It should be noted that the purification of the molten metal may include intermediate steps of holding the molten metal prior to its forming the desired article, whether a casting, an ingot or a pre-form of some type. The present invention is not be confined solely to transferring the molten metal from a container into a mold that will form the final casting. In other words, the present invention also finds utility in intermediate processing of castable metals.

In accordance with the invention, the metal is melted in a container. This particular step of the method of the present invention can be accomplished in a conventional manner. Particular success, however, has been experienced using the apparatus depicted in FIGS. 1 and 2. In the disclosed apparatus, the molten metal 10 is within a ceramic crucible 12 that is, in turn, surrounded by thermal insulation 14. The temperature of the molten metal 10 is monitored and controlled through thermocouple ports 16. The molten metal is heated by induction coils 18 which, in this embodiment, heat a separate carbon susceptor 20 disposed between the molten metal 10 and the induction coils 18. The carbon susceptor 20 is heated by the induction coils 18 and the heat from the suceptor flows by conduction to the crucible 12 and its molten melt 10. The use of the separate susceptor is preferred, however, other means of melting themetal or holding the molten metal may be used. The subsequent process step of maintaining the molten metal in a quiescent state can affect the manner in which the metal is stored in the container. With respect to the melting step, however, one of ordinary skill in the art to which the invention pertains can readily devise means for melting the metal that are consistent with the objects of the present invention, either by use of disclosed embodiment or through conventional melting practice. The molten metal is confined in a container or crucible, preferably of a ceramic material that is stable at high temperatures such that the ceramic does not introduce ceramic particles from the crucible into the molten metal.

In accordance with the invention, the molten metal is maintained in a quiescent state to allow buoyant impurites therein to float to the top of the molten metal. For purposes of the present invention a quiescent state is one where there is little movement of the molten metal within the crucible such that impurites in the molten metal are not entrained by motion of molten metal.

Figure 2:
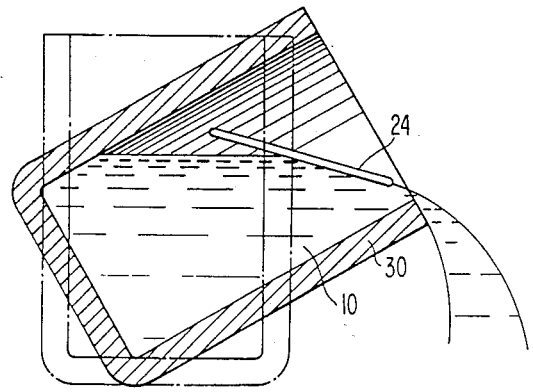
FIG. 2 is a schematic cross section of the container showing the pouring of the molten metal from beneath the solid portion in the container.

As depicted in FIG. 1, the apparatus used to melt the metal includes a separate susceptor that interacts with the induction heater such that there is minimal electromagnetic stirring of the liquid metal. With the liquid metal in a quiescent state, the impurities within the liquid metal that are buoyant will rise to the surface of the liquid metal. Even contaminants that may not be buoyant in the liquid metal may rise to the top inasmuch as they may become associated with other buoyant contaminant materials.

In accordance with the invention, the method includes the step of cooling the top of the molten metal to solidify the top portion into a solid top layer and thereby entrapping impurities within the solid top layer. As here embodied and depicted in FIG. 1, the liquid metal being maintained in a quiescent state has allows the buoyant impurities to float to the top of the liquid metal. Removal of the crucible lid 22 allows heat loss from the top of the melt, thereby solidifying the melt and forming the solid layer 24. Once in the top portion of the melt, the impurities are then entrapped within the solid top layer 24.

In some applications of the present process, the solid layer may adhere to the crucible and restrain the liquid metal from being poured from the container. In such a case, the portion 26 of the solid layer 24 adjacent the container should be melted locally to allow the liquid metal to escape from beneath the solid portion. Where the solid layer does not adhere to the crucible (as shown in FIG. 1) no affirmative step of melting the solid layer adjacent the container is necessary.

In accordance with the invention, the molten metal is poured from beneath the solid layer. As here embodied and depicted in FIG. 2, the container 30 is tipped and the liquid metal 10 poured from the container out from beneath the solid layer 24 which contains the entrapped contaminants. In addition to entrapping contaminants within the melt that have been solidified therein, the solid layer 24 on the surface of the melt also provides a physical barrier that will prevent buoyant materials on the surface of the melt from entering the casting.

The present invention is particularly suited for the casting of materials in controlled environments such as, for example, vacuum casting. The process steps of cooling the top of the molten metal can be accomplished by removing an insulating cover therefrom. Melting the peripheral portion 26 portion of the solid layer 24 adjacent the container and tipping the container to cast the liquid metal therein into the desired article may all be accomplished by conventional techniques without complex changes to conventional casting practices.

EXAMPLE

The present invention was used to purify and form an ingot of a nickel-base superalloy having the composition (in weight percent) of 12.4% Cr, 18.5% Co, 3.3% Mo, 4.3% Ti, 5.0% Al, 0.4% Hf, 1.4% Cb and the balance Ni. The metal was melted and cast into a 5.5 inch diameter steel mold in accordance with the present invention. Samples weighing 5 pounds were removed from the ingot and their cleanliness evaluated by a standard election beam melting technique employing a furnace having a water cooled hemispherical hearth.

In such a technique, the charge to be evaluated is melted by the election beam, then the power of the electron beam is reduced and the molten metal solidifies from the hearth walls inward. During solidification any inclusions are swept ahead of the solidifying metal assisted by the buoyant effects of the lower density of the inclusions. Thus, the inclusions are concentrated in the last area to solidify forming what is termed a "raft". The area of the raft is a measure of the cleanliness of the metal and the validity of such a technique has been confirmed by metallography.

In a typical vacuum induction melted material of a composition set out above the "raft" values would range from 9.7 to 26.6 for the melting parameters employed for the weight of metal tested. Raft values of from 1.43 to 2.73 were obtained for the material of the example using the present invention. This represents a substantial reduction in the impurity content for such an alloy.

The present invention has been disclosed in terms of a preferred embodiment. The invention, however, is not limited thereto. The scope of the invention is defined by the appended claims and their equivalents.

What is claimed is:

1. A method of purifying molten metal comprising the steps of:
   (a) providing an inert atmosphere;
   (b) melting said metal in said atmosphere to form molten metal;
   (c) placing said molten metal in a container;
   (d) maintaining the molten metal in a quiescent state to allow buoyant impurities therein to float to the top of the molten metal;
   (e) cooling the top of said molten metal to solidify the top portion of said molten metal to form a solid layer for entrapping said impurities in said solid layer;
   (f) melting the portion of said solid layer adjacent said container; and
   (g) pouring said molten metal from beneath said solid layer.

2. The method of claim 1 wherein said container includes an insulated cover for limiting heat loss from said molten metal and the step of cooling the top of said molten metal comprises removing said insulated cover from the top of said container.

3. The method of claim 1 wherein said metal is melted by induction heating.

4. The method of claim 3 wherein said method includes the step of reducing electromagnetic stirring of said molten metal.

5. The method of claim 1 wherein said method includes the steps of pouring said molten metal into a mold to form a casting.

* * * * *